US008787263B2

(12) United States Patent
Park et al.

(10) Patent No.: US 8,787,263 B2
(45) Date of Patent: Jul. 22, 2014

(54) APPARATUS AND METHOD FOR ESTIMATING CHANNEL BASED ON WEATHER DATA

(75) Inventors: Mankyu Park, Daejeon (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 71 days.

(21) Appl. No.: 13/611,120

(22) Filed: Sep. 12, 2012

(65) Prior Publication Data
US 2013/0114442 A1 May 9, 2013

(30) Foreign Application Priority Data
Nov. 8, 2011 (KR) .................. 10-2011-0115939

(51) Int. Cl.
H04W 24/00 (2009.01)
(52) U.S. Cl.
USPC .................. 370/328; 375/268; 455/452.2
(58) Field of Classification Search
None
See application file for complete search history.

(56) References Cited

U.S. PATENT DOCUMENTS

| 2002/0142732 | A1* | 10/2002 | Asano ............................ 455/73 |
| 2008/0214198 | A1* | 9/2008 | Chen et al. .................... 455/450 |
| 2009/0135789 | A1* | 5/2009 | Snapir et al. .................. 370/336 |
| 2013/0185617 | A1* | 7/2013 | Roh et al. ...................... 714/800 |

FOREIGN PATENT DOCUMENTS

| EP | 1 906 578 A2 | 4/2008 |
| JP | 2653750 B2 | 5/1997 |
| KR | 10-0826526 B1 | 4/2008 |

OTHER PUBLICATIONS

Dalil Moad, et al; "Predictive Channel Estimation for Optimized Resources Allocation in DVB-S2 Networks", 2009 IEEE 20th International Symposium on Personal, Indoor and Mobile Radio Communications; Sep. 13-16, 2009, pp. 2608-2612.

* cited by examiner

Primary Examiner — Anh-Vu Ly
Assistant Examiner — Hashim Bhatti
(74) Attorney, Agent, or Firm — Ladas & Parry LLP

(57) ABSTRACT

In a satellite communication system, a central station receives a message including channel measurement information that is provided from a terminal and calculates a channel estimating value based on the received channel measurement information and weather data of a region corresponding to a location of the terminal. The central station determines encoding and modulation methods of data to transmit based on the calculated channel estimating value.

14 Claims, 4 Drawing Sheets

APPARATUS AND METHOD FOR ESTIMATING CHANNEL BASED ON WEATHER DATA

CROSS-REFERENCE TO RELATED APPLICATION

This application claims priority to and the benefit of Korean Patent Application No. 10-2011-0115939 filed in the Korean Intellectual Property Office on Nov. 8, 2011, the entire contents of which are incorporated herein by reference.

BACKGROUND OF THE INVENTION (a) Field of the Invention

The present invention relates to a method and apparatus for estimating a channel. More particularly, the present invention relates to a method and apparatus for selecting encoding and modulation methods by estimating a channel based on weather data in a satellite broadcasting communication system.

(b) Description of the Related Art

A Digital Video Broadcasting Second Generation (DVB-S2) method, which is a standard of a European type of satellite broadcasting communication method, uses an adaptive coding modulation (ACM) technique in order to improve transmission efficiency further by 30% or more than an existing DVB-S method. The ACM technique is a method of coping with a satellite channel characteristic in which link quality changes and provides high band efficiency and throughput by optimally selecting encoding and modulation methods for a channel state according to a signal attenuation degree on a satellite link.

According to the ACM technique, a terminal measures a channel state and automatically selects appropriate encoding and modulation methods based on a measurement result. Alternatively, in order for a central station to enable selection of appropriate encoding and modulation methods, the terminal transmits a present signal-to-noise ratio (SNR) value to a central station through a backward link. Thereafter, the central station changes the encoding and modulation methods to those that are requested by the terminal using received information, or estimates and determines the most appropriate encoding and modulation methods based on an SNR value that is transmitted by the terminal and encodes, modulates, and transmits data of a forward link according to the determined encoding and modulation methods.

When the terminal transmits measured information (e.g., an SNR value and information that requests selection of encoding and modulation methods) to the central station through a backward link, the terminal transmits the information using a user diagram protocol (UDP) format. In this case, when a geostationary orbit satellite is used, due to a long transmission delay time (e.g., about 250 s), which is a characteristic of a satellite network, an SNR value that is used when the central station determines encoding and modulation methods already becomes outdated data.

Moreover, when an ACM control message from the terminal is transmitted using a UDP protocol having no reliability, a corresponding packet may be damaged. In this case, because a time internal between measurement data sample values, which are SNR values that are transmitted from the terminal for ACM selection, further increases, an accurate state of a present forward link may not be known and a more outdated value is used as a sample value. Therefore, a method of selecting encoding and modulation methods by more accurately estimating a channel state in which data is transmitted is requested.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for estimating a channel having advantages of selecting optimal encoding and modulation methods by accurately estimating a channel state using weather data in a communication system using an ACM technique.

An exemplary embodiment of the present invention provides a method of estimating a channel, the method including: receiving, by a central station, a message including channel measurement information from a terminal; extracting, by the central station, channel measurement information from the received message and acquiring sample data by processing the channel measurement information; acquiring, by the central station, weather data corresponding to a region at which the terminal is located; calculating, by the central station, a channel estimating value based on the sample data and the weather data; and determining, by the central station, encoding and modulation methods for processing data based on the channel estimating value.

The acquiring of sample data may include: providing a first weight value to previously calculated sample data and applying a different weight value from the first weight value to present channel measurement information that is extracted from the received message; and calculating sample data of the received message based on the previous sample data to which the first weight value is applied and present channel measurement information to which a different weight value from the first weight value is applied.

The calculating of a channel estimating value may include: providing a second weight value to the acquired sample data and applying a different weight value from the second weight value to the weather data; and calculating the channel estimating value based on sample data to which the second weight value is applied and the weather data to which a different weight value from the second weight value is applied.

The method may further include: determining whether a corresponding terminal is a registered terminal based on the received message; and removing, if a corresponding terminal is not a registered terminal, the received message. The acquiring of sample data may include acquiring, if a corresponding terminal is a registered terminal, the sample data based on channel measurement information of the received message.

Another embodiment of the present invention provides a channel estimation apparatus including: a filtering unit that extracts channel measurement information from a message including channel measurement information that is received from a terminal and that acquires sample data by processing the channel measurement information; a weather data acquisition unit that acquires weather data corresponding to a region at which the terminal is located; a channel estimation unit that calculates a channel estimating value based on the sample data and the weather data; and a determining unit that determines encoding and modulation methods for processing data based on the channel estimating value.

The filtering unit may provide a first weight value to previously calculated sample data and calculate sample data based on a presently received message by providing a different weight value from the first weight value to channel measurement information that is extracted from the received message.

The channel estimation unit may calculate the channel estimating value by providing a second weight value to sample data that is calculated by the filtering unit and providing a different weight value from the second weight value to the weather data.

In the present invention having such a characteristic, the channel measurement information may be a signal-to-noise ratio (SNR) value, and the weather data may be a cumulative average value of weather data that are accumulated during a predetermined period.

The channel estimation apparatus may periodically receive and use weather data corresponding to a predetermined period from a weather data storage device that measures and manages weather data.

DETAILED DESCRIPTION OF THE EMBODIMENTS

Figure 1:
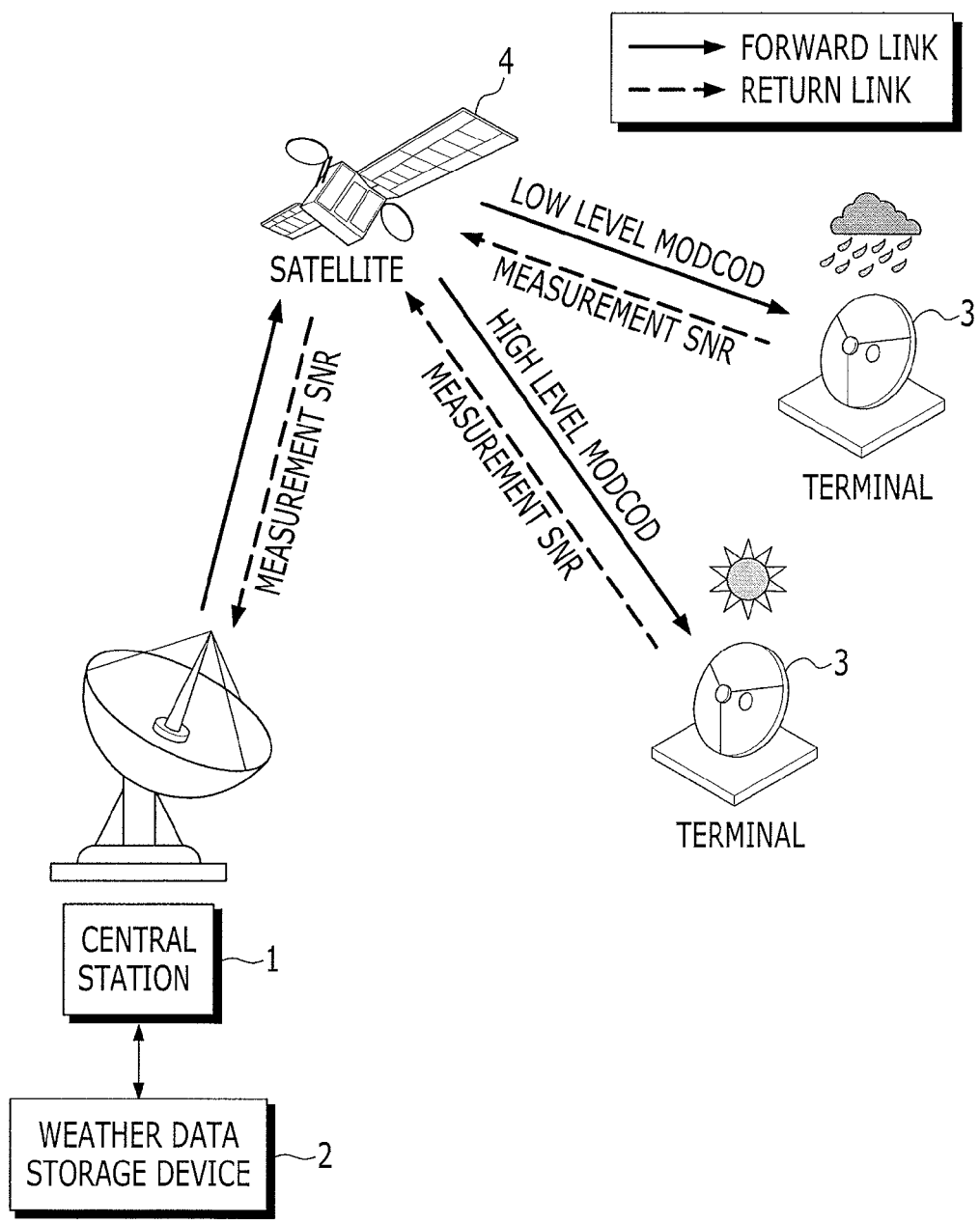
FIG. 1 is a diagram illustrating a network environment according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

In this specification, a terminal may indicate an earth station, a return channel satellite terminal (RCST), a mobile station (MS), a mobile terminal (MT), a subscriber station (SS), a portable subscriber station (PSS), user equipment (UE), and an access terminal (AT), and may include an entire function or a partial function of the earth station, the RCST, the MT, the SS, the PSS, and the UE.

In this specification, a central station may indicate a base station (BS), an access point (AP), a radio access station (RAS), a node B, a base transceiver station (BTS), and a mobile multihop relay (MMR)-BS, and may include an entire function or a partial function of the AP, the RAS, the node B, the BTS, and the MMR-BS.

Hereinafter, a method and apparatus for estimating a channel based on weather data according to an exemplary embodiment of the present invention will be described with reference to the drawings.

FIG. 1 is a diagram illustrating a network environment according to an exemplary embodiment of the present invention.

As shown in FIG. 1, in a satellite communication system, a central station 1 according to an exemplary embodiment of the present invention communicates with a weather data storage device 2 that stores and manages weather data and transmits and receives data to and from an earth station, i.e., a terminal 3, through a satellite 4.

The satellite 4 relays communication between the central station 1 and the terminal 3 or communication between the terminals 3, and forms a communication link with the terminal 3 that is located at a service region that is divided into a plurality of cells through a predetermined beam. The terminal 3 transmits and receives data to and from the central station 1 through a communication link that is formed between the terminal 3 and the satellite 4. Such terminals may be return channel satellite terminals (RCST).

The central station 1 connects, operates, and manages another wireless communication network and a satellite communication network like a plurality of ground networks or the Internet, and for example, transmits data to the terminal 3 through a forward link and receives data from the terminal 3 through a return link. In an exemplary embodiment of the present invention, a channel state is estimated, and encoding and modulation methods (referred to as MODCOD) for transmitting/receiving data based on an estimated result are determined. For this purpose, the central station 1 receives weather data from the weather data storage device 2.

The weather data storage device 2 stores and manages weather data and provides the weather data to the central station 1. The weather data includes all data that are related to a physical phenomenon occurring in the atmosphere, and for example, includes data that is related to the weather such as wind, cloud, rain, snow, hot weather, and cold weather. The weather data storage device 2 may be a server that is managed by an institution (e.g., the Meteorological Administration) that measures weather.

The terminal 3 transmits a message including channel measurement information to the central station 1, and decodes and demodulates a signal that is transmitted from the central station 1 according to determined channel coding and modulation methods that are transmitted from the central station 1. In order to determine channel coding and modulation methods, a message, i.e., an ACM control message that is transmitted to the central station 1, has the following format.

Figure 2:
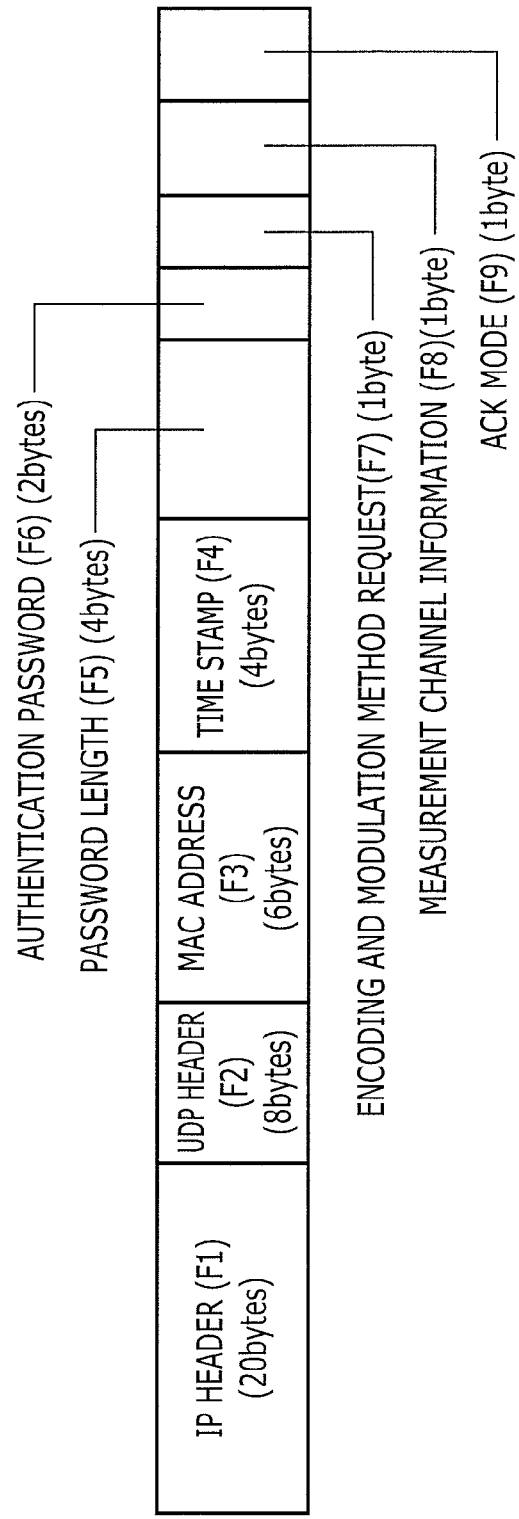
FIG. 2 is a diagram illustrating an ACM control message structure according to an exemplary embodiment of the present invention.

FIG. 2 is a diagram illustrating an ACM control message structure according to an exemplary embodiment of the present invention.

As shown in FIG. 2, an ACM control message that is transmitted from the terminal 3 according to an exemplary embodiment of the present invention is formed in a user diagram protocol (UDP) format. Specifically, an ACM control message in which the terminal 3 requests encoding and modulation methods includes an IP header field F1, a UDP header field F2, a MAC address field F3, and a time stamp field F4, and additionally includes a password length field F5, an authentication password field F6, an encoding and modulation method request field F7, a measurement channel information field F8, and an ACK mode field F9.

The measurement channel information field F8 includes channel state related information that is measured by the terminal. In an exemplary embodiment of the present invention, a signal-to-noise ratio (SNR) value is used as channel measurement information representing a channel state, but it is not limited thereto. The terminal 3 records a value representing a method request in the encoding and modulation method request field F7, transmits an ACM control message, and requests determination of appropriate encoding and modulation methods from the central station 1.

The central station 1 estimates a channel state based on such an ACM control message, selects optimal channel encoding and modulation methods according to the estimated channel state, and processes and transmits data according to the selected channel encoding and modulation methods. For this purpose, the central station 1 according to an exemplary embodiment of the present invention includes a channel estimation apparatus 11 (see FIG. 3).

Figure 3:
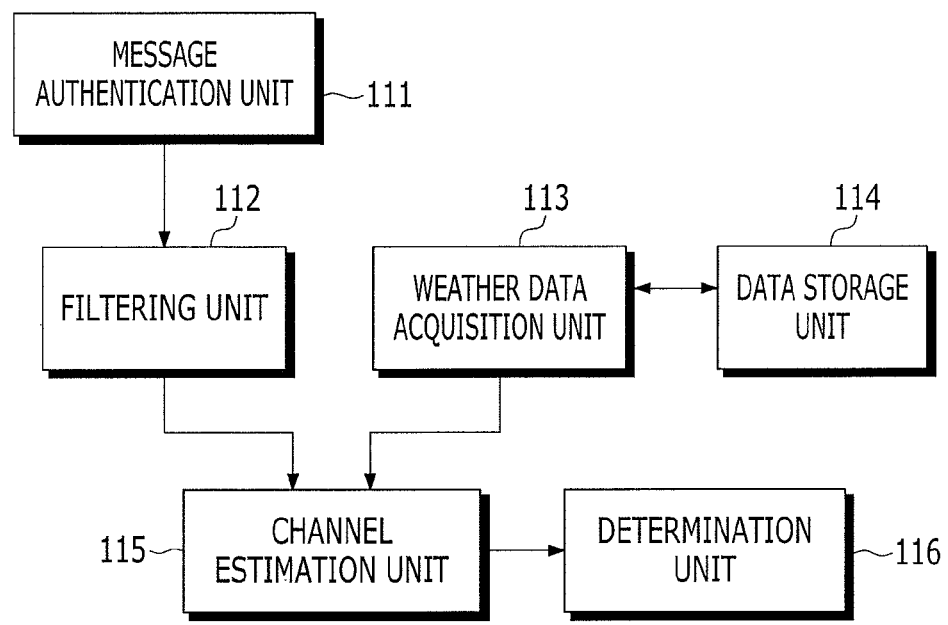
FIG. 3 is a block diagram illustrating a configuration of a channel estimation apparatus according to an exemplary embodiment of the present invention.

FIG. 3 is a block diagram illustrating a configuration of a channel estimation apparatus according to an exemplary embodiment of the present invention.

The channel estimation apparatus 11 according to an exemplary embodiment of the present invention includes a message authentication unit 111, a filtering unit 112, a weather data acquisition unit 113, a data storage unit 114, a channel estimation unit 115, and a determination unit 116.

The message authentication unit 111 authenticates a message that is provided from a terminal. Specifically, the message authentication unit 111 performs an authentication processing of an ACM control message that is provided from a terminal. If the received ACM control message is provided from a registered terminal that receives a service of a corresponding central station, the message authentication unit 111 uses the message, and if the received ACM control message is provided from an unregistered terminal, the message authentication unit 111 removes the message.

The weather data acquisition unit 113 receives weather data on a region basis from the weather data storage device 2 and stores the weather data in the data storage unit 114. The weather data acquisition unit 113 receives weather data of a predetermined region on a predetermined cycle basis or receives weather data if necessary. The data storage unit 114 stores and manages weather data on a region basis.

Because it is inefficient for the central station to store all wide weather data, in an exemplary embodiment of the present invention, the channel estimation apparatus 11 receives a predetermined amount of weather data from the weather data storage device 2 according to a predetermined cycle. For example, in order to efficiently use resources of the apparatus while interlocking with the weather data storage device 2 through a security channel, the channel estimation apparatus 11 previously brings only weather data of about a predetermined period (e.g., 1 hour). Particularly, in an exemplary embodiment of the present invention, the channel estimation apparatus 11 of the central station 1 receives necessary weather data in consideration of a location of the connected terminal 3.

The filtering unit 112 filter-processes and outputs an SNR value, which is channel measurement information that is included in a received message from a terminal. Here, the filter processing is to process an extracted SNR value based on a weighted moving average technique. In the weighted moving average technique, present data is processed with a weight value instead of processing past data and present data with the same weight, and here, the filtering unit 112 outputs sample data by adding and processing a weight value to a data SNR value that is included in an ACM message that is provided from a present terminal.

For example, when an SNR value, which is channel measurement information of a terminal that is included in an ACM control message, is referred to as "$S_i$" (i=0, 1, 2, 3 ... ) and sample data that is calculated based on an SNR value that is transmitted by a corresponding terminal is referred to as "$V_i$", sample data may be calculated by filter-processing a present SNR value based on Equation 1.

$$V_i = \alpha V_{i-1} + (1-\alpha) S_i \quad \text{[Equation 1]}$$

Here, $V_i$ represents presently calculated sample data, $V_{i-1}$ represents previously calculated sample data, and α represents a first weight value. $S_i$ represents an SNR value that is received from a present terminal.

As shown in Equation 1, by applying a weight value (1−a first weight value) having a different value from a weight value (a first weight value) that is added to previously calculated sample data to a presently measured SNR value, sample data according to a present SNR value is calculated.

The channel estimation unit 115 calculates weather data based on a terminal location and a channel estimating SNR value based on sample data. The channel estimation unit 115 generates a channel estimating SNR value by combining a cumulative average value of weather data that is acquired to correspond to a terminal location, i.e., weather data that is measured during a predetermined period in a region corresponding to a terminal location and an SNR value, which is sample data.

For example, when weather data corresponding to a terminal location is referred to as "$R_i$", a channel estimating SNR value "$P_i$" may be calculated by combining present sample data and weather data based on Equation 2.

$$P_i = \beta V_i + (1-\beta) R_i \quad \text{[Equation 2]}$$

Here, $P_i$ represents a presently calculated channel estimating SNR value, $V_i$ represents sample data that is acquired by filtering processing a present SNR value, and β represents a second weight value. $R_i$ represents weather data of a region corresponding to a present terminal location.

As shown in Equation 2, by applying a weight value (1−a second weight value) having a different value from a weight value (a second weight value) that is added to presently calculated sample data to weather data, a present SNR value and a channel estimating value according to weather data are calculated.

Weather data on a region basis according to an exemplary embodiment of the present invention is a cumulative average value of weather data that are accumulated during a predetermined period. Future weather data of a corresponding region may be estimated based on a cumulative average value of weather data that are accumulated during a predetermined period. The channel estimation apparatus 11 receives and stores weather data that is provided from the weather data storage device 2, calculates an average value of weather data that are accumulated for a predetermined period, and uses the average value as weather data for the following processing. Here, it is described that the channel estimation apparatus calculates a cumulative average value of weather data, but the weather data storage device 2 may calculate an average value of weather data that are accumulatively measured for a predetermined period on a region basis and provide weather data corresponding thereto to the channel estimation apparatus 11.

The determination unit 116 determines optimal encoding and modulation methods of data to provide to a corresponding terminal based on a channel estimating SNR value that is calculated by the channel estimation unit 115.

Hereinafter, a method of estimating a channel based on such a structure according to an exemplary embodiment of the present invention will be described.

Figure 4:
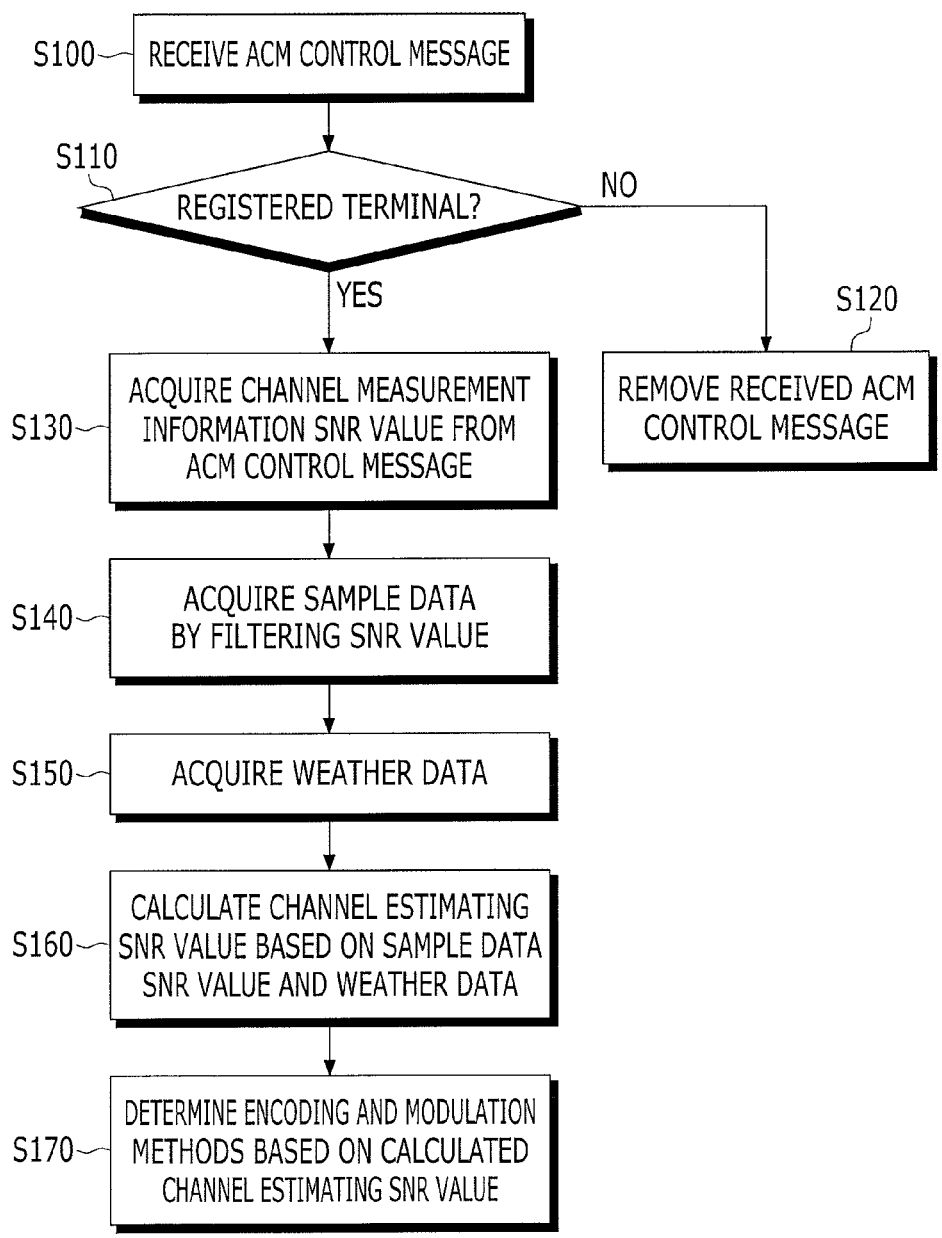
FIG. 4 is a flowchart illustrating a method of estimating a channel according to an exemplary embodiment of the present invention.

FIG. 4 is a flowchart illustrating a method of estimating a channel according to an exemplary embodiment of the present invention.

As shown in FIG. 4, the channel estimation apparatus 11 according to an exemplary embodiment of the present invention receives an ACM control message from each terminal (S100). For example, in DVB-S2, when the central station 1 transmits a packet to the terminal 3 through a satellite, the channel estimation apparatus 11 may receive a message including information representing a channel state thereof from each terminal through a return channel (a repeater that is installed on the ground).

The channel estimation apparatus 11 determines whether a corresponding terminal is a registered terminal based on a MAC address of a terminal that is included in the received ACM control message (S110). That is, the channel estimation apparatus 11 determines whether a terminal that transmits an ACM control message is registered as a terminal that receives a service from the corresponding central station. If a corresponding terminal is not a registered terminal, the channel estimation apparatus 11 removes the ACM control message that is transmitted by the corresponding terminal (S120).

If a terminal that transmits an ACM control message is a registered terminal, the channel estimation apparatus 11 extracts an SNR value that is included in a measurement channel information field F8 of the received ACM control message (S130). The channel estimation apparatus 11 acquires sample data by filtering the extracted SNR value based on a weighted moving average technique (S140).

The channel estimation apparatus 11 determines a present location of the terminal 3 and acquires weather data of a region corresponding to the determined terminal location (S150). Here, the acquired weather data is a cumulative average value of weather data that are accumulated during a predetermined period and is data that may estimate a future weather state of a corresponding region.

Thereafter, the channel estimation apparatus 11 generates a channel estimating SNR value by combining calculated sample data based on a cumulative average value of weather data that is acquired to correspond to a terminal location, i.e., weather data that are measured during a predetermined period in a region corresponding to a terminal location and a presently measured SNR value (S160). The channel estimation apparatus 11 calculates a channel estimating SNR value by combining sample data that is acquired by filtering a present SNR value based on a first weight value and weather data representing a future weather state as a cumulative average value for a predetermined period based on a second weight value, and the calculated channel estimating SNR value may represent a future channel state.

Thereafter, the channel estimation apparatus 11 determines optimal encoding and modulation methods of data to provide to a corresponding terminal based on the calculated channel estimating SNR value (S170). A channel estimating SNR value according to an exemplary embodiment of the present invention is a calculated SNR value based on weather data that is accumulated for a predetermined period in a region at which a terminal is located instead of an SNR value that is provided from a terminal, and thus is a value in which a present channel state and a future channel state are considered. By determining an encoding method and a modulation method based on such a channel estimating SNR value, data can be processed and transmitted according to an optimal encoding and modulation method in consideration of a weather state of a region at which a terminal is located. Therefore, a predetermined amount of data can be provided to a terminal regardless of a weather state.

According to an exemplary embodiment of the present invention, in a satellite broadcasting communication system, unlike a technique of estimating by monitoring only a present channel change state, by mixing weather data that is accumulated for a present weather forecast and data representing a present channel state and thus by estimating a future channel state, a channel can be more accurately estimated.

Further, by periodically bringing a necessary predetermined amount of weather data from a weather data storage device using a security channel and using the weather data for estimating a channel, memory capacity of a system can be efficiently used.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from the description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of estimating a channel, the method comprising:
    receiving, by a central station, a message comprising channel measurement information from a terminal;
    extracting, by the central station, channel measurement information from the received message and acquiring sample data by processing the channel measurement information;
    acquiring, by the central station, weather data corresponding to a region at which the terminal is located, wherein the acquiring of sample data comprises:
        providing a first weight value to previously calculated sample data and applying a different weight value from the first weight value to present channel measurement information that is extracted from the received message; and
        calculating sample data of the received message based on the previous sample data to which the first weight value is applied and present channel measurement information to which a different weight value from the first weight value is applied;
    calculating, by the central station, a channel estimating value based on the sample data and the weather data; and
    determining, by the central station, encoding and modulation methods for processing data based on the channel estimating value.

2. The method of claim 1, wherein, in the acquiring of weather data, the central station acquires the weather data from a weather data storage device that measures and manages weather data.

3. The method of claim 2, wherein the central station receives weather data corresponding to a predetermined period from the weather data storage device at a predetermined cycle.

4. The method of claim 1, wherein the channel measurement information is a signal-to-noise ratio (SNR) value.

5. The method of claim 1, wherein the calculating of a channel estimating value comprises:

providing a second weight value to the acquired sample data and applying a different weight value from the second weight value to the weather data; and calculating the channel estimating value based on sample data to which the second weight value is applied and the weather data to which a different weight value from the second weight value is applied.

6. The method of claim 5, wherein the weather data is a cumulative average value of weather data that are accumulated during a predetermined period.

7. The method of claim 1, further comprising:

determining whether a corresponding terminal is a registered terminal based on the received message; and removing, if a corresponding terminal is not a registered terminal, the received message, wherein the acquiring of sample data comprises acquiring, if a corresponding terminal is a registered terminal, the sample data based on channel measurement information of the received message.

8. The method of claim 1, wherein the received message is formed in a user diagram protocol (UDP) format.

9. A method of estimating a channel, the method comprising:

receiving, by a central station, a message comprising channel measurement information from a terminal;

extracting, by the central station, channel measurement information from the received message and acquiring sample data by processing the channel measurement information;

acquiring, by the central station, weather data corresponding to a region at which the terminal is located;

calculating, by the central station, a channel estimating value based on the sample data and the weather data, wherein the calculating of a channel estimating value comprises:

providing a weight value to the acquired sample data and applying a different weight value from the weight value to the weather data; and calculating the channel estimating value based on sample data to which the weight value is applied and the weather data to which a different weight value from the weight value is applied; and determining, by the central station, encoding and modulation methods for processing data based on the channel estimating value.

10. The method of claim 9, wherein the acquiring of sample data comprises:

providing a first weight value to previously calculated sample data and applying a different weight value from the first weight value to present channel measurement information that is extracted from the received message; and calculating sample data of the received message based on the previous sample data to which the first weight value is applied and present channel measurement information to which a different weight value from the first weight value is applied.

11. The method of claim 9, further comprising:

determining whether a corresponding terminal is a registered terminal based on the received message; and removing, if a corresponding terminal is not a registered terminal, the received message, wherein the acquiring of sample data comprises acquiring, if a corresponding terminal is a registered terminal, the sample data based on channel measurement information of the received message.

12. The method of claim 9, wherein the channel measurement information is a signal-to-noise ratio (SNR) value.

13. The method of claim 9, wherein the weather data is a cumulative average value of weather data that are accumulated during a predetermined period.

14. The method of claim 9, wherein, in the acquiring of weather data, the central station acquires the weather data from a weather data storage device that measures and manages weather data; and the central station receives weather data corresponding to a predetermined period from the weather data storage device at a predetermined cycle.

* * * * *